United States Patent
Burns et al.

(10) Patent No.: US 9,935,962 B2
(45) Date of Patent: Apr. 3, 2018

(54) METHOD AND SYSTEM FOR ONBOARDING WIRELESS-ENABLED PRODUCTS IN A NETWORK

(71) Applicant: QUALCOMM Incorporated, San Diego, CA (US)

(72) Inventors: Gregory Burns, Seattle, WA (US); Christopher Kavas, Lynnwood, WA (US); Marcello Lioy, Mercer Island, WA (US); Kenneth Swinson, San Diego, CA (US); Todd Malsbary, Seattle, WA (US); Matthew Michael, Redmond, WA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 15/000,105

(22) Filed: Jan. 19, 2016

(65) Prior Publication Data

US 2017/0208070 A1    Jul. 20, 2017

(51) Int. Cl.
*H04L 29/06* (2006.01)
*H04L 29/08* (2006.01)
(Continued)

(52) U.S. Cl.
CPC ........... *H04L 63/102* (2013.01); *G06Q 30/00* (2013.01); *H04L 63/0876* (2013.01);
(Continued)

(58) Field of Classification Search
None
See application file for complete search history.

(56) References Cited

U.S. PATENT DOCUMENTS 9,003,189 B2 * 4/2015 Yin .................. H04L 63/0807
713/168
9,009,230 B1    4/2015 Matthieu et al.
(Continued)

OTHER PUBLICATIONS

International Search Report and Written Opinion—PCT/US2016/063349—ISA/EPO—dated Mar. 1, 2017.
(Continued)

*Primary Examiner* — Maung T Lwin
(74) *Attorney, Agent, or Firm* — The Marbury Law Group

(57) ABSTRACT

Various embodiments provide systems and methods for connecting wireless-enabled products to wireless networks. Customer network credentials may be stored in a server along with a customer identifier ("customer ID") during one-time registration. When a wireless-enabled product is purchased, a product identifier ("product ID") and the customer's ID are forwarded to the server, which correlates the two identifiers, linking the purchased product to the customer. When the wireless-enabled product is powered on, the product accesses the server via a public network connection, and sends the product ID and a security token to the server. The server uses the product ID and the security token to authenticate the product. Once authenticated, the server uses the correlated customer ID to look up the network credentials for the customer's private network, and provides the network credentials to the wireless-enabled product. The wireless-enabled product then uses the downloaded credentials to access the customer's private network.

17 Claims, 11 Drawing Sheets

(51) Int. Cl.
*H04W 4/00* (2018.01)
*H04W 12/06* (2009.01)
*G06Q 30/00* (2012.01)
*H04W 12/04* (2009.01)
*H04W 88/08* (2009.01)

(52) U.S. Cl.
CPC ............ *H04L 67/12* (2013.01); *H04W 4/005* (2013.01); *H04W 4/008* (2013.01); *H04W 12/04* (2013.01); *H04W 12/06* (2013.01); *H04W 88/08* (2013.01)

(56) References Cited

U.S. PATENT DOCUMENTS

| | | | |
|---|---|---|---|
| 9,479,937 B2* | 10/2016 | O'Toole | H04W 12/08 |
| 2003/0005088 A1 | 1/2003 | Remer | |
| 2008/0209221 A1* | 8/2008 | Vennelakanti | H04L 63/062 |
| | | | 713/183 |
| 2011/0004615 A1* | 1/2011 | Counterman | G06F 17/30905 |
| | | | 707/769 |
| 2014/0075188 A1* | 3/2014 | Yin | H04L 63/0807 |
| | | | 713/168 |
| 2014/0181521 A1 | 6/2014 | Hemphill et al. | |
| 2015/0023183 A1 | 1/2015 | Ilsar et al. | |
| 2015/0063164 A1* | 3/2015 | Hemphill | H04L 9/0819 |
| | | | 370/254 |
| 2015/0095999 A1* | 4/2015 | Toth | H04L 63/08 |
| | | | 726/6 |
| 2015/0121554 A1* | 4/2015 | Trimper | G06F 21/10 |
| | | | 726/29 |
| 2015/0146706 A1 | 5/2015 | Goluboff | |
| 2015/0222621 A1 | 8/2015 | Baum et al. | |
| 2015/0249663 A1 | 9/2015 | Svigals | |
| 2015/0334108 A1* | 11/2015 | Khalil | G06F 21/31 |
| | | | 726/8 |
| 2016/0119332 A1* | 4/2016 | Pitroda | G06Q 20/02 |
| | | | 726/6 |
| 2016/0283965 A1* | 9/2016 | Ellis, III | G06Q 30/0226 |

OTHER PUBLICATIONS

Virji H., "LoT Meets Security," Samsung Open Source Group, Samsung Research, Oct. 5-7, 2015, 32 Slides.

* cited by examiner

METHOD AND SYSTEM FOR ONBOARDING WIRELESS-ENABLED PRODUCTS IN A NETWORK

BACKGROUND

Common customer appliances and electrical devices are being equipped to connect to wireless networks to provide smart homes and lighting system controlled by smartphones. Networking common electrical components and appliances is sometimes referred to as the "Internet of Things" (IoT) or the "Internet of Everything" (IoE).

While including wireless connectivity in ordinary appliances and integrating such smart appliances in wireless networks will provide customers with convenience and new services, the widespread deployment of such technologies will require customers to learn how to implement and use such devices. One reason that customers may resist implementing networked devices is the perceived difficulty of installing a smart appliance in a customer's private network. The process of configuring a smart appliance to communicate with a private wireless network involves exchanging credentials so that a secure communication link can be can be established between the appliance and the network. This process is sometimes referred to as "onboarding."

While customers are increasingly familiar with connecting a computer or smart phone to a private wireless network (e.g., WiFi network), the onboarding process is more challenging for appliances that lack a display and user interface (e.g., keyboard). Devices without a display and convenient user interface are sometimes referred to as "headless devices." Headless devices typically require the use of another computing device to complete the onboarding process, requiring customers to obtain another device or configure their smartphone or other device with an onboard application that they must learn how to use. Thus, on boarding of headless devices can be intimidating or frustrating to for customers who are uncomfortable with technology. Thus, to enable the widespread deployment of Internet of Things devices, simple and convenient installation procedures are desirable.

SUMMARY

Various embodiments include methods, devices and system configured for facilitating the connection of a wireless-enabled product to a private communication network. Various embodiments may include storing in a server an identifier of a customer ("customer ID") and network credentials for accessing a private communication network of the customer prior to a purchase transaction. During a enabling a purchase transaction in which the customer purchases a wireless-enabled product, a computing device enabling the purchase transaction may obtain the customer's ID and a device ID associated with the wireless-enabled product, and provide the customer ID and the device ID to the server. Upon receiving this information, the server may store an association of the customer ID and the device ID by the server. At some time after or during the purchase transaction the wireless-enabled product may establish a connection to the server, such as via a public network, and transmit the device ID, which is stored in memory, and a security token to the server through the established connection. Upon receiving this information, the server may authenticate the wireless-enabled product based on the device ID and security token, and provide the network credentials for accessing the private communication network of the customer to the wireless-enabled product in response to authenticating the wireless-enabled product. The wireless-enabled product may then disconnect from the established connection to the server and, upon entering a range of an access device for the private communication network, establish a connection with the private communication network using the network credentials for accessing the customer's private communication network provided by the server.

In some embodiments, the customer ID and the network credentials for accessing the customer's private communication network may obtained by the server during a customer registration process in which customer information is entered. In some embodiments the customer registration process may be a sign up procedure for a customer loyalty program. In some embodiments, the computing device enabling the purchase transaction may obtain the customer ID from a customer loyalty database associated with a retailer.

In some embodiments, the wireless-enabled product may establish the connection to the server through a guest access mechanism of the access device for the customer's private communication network. In some embodiments, the wireless-enabled product may establish the connection to the server through a public network.

Some embodiments may include methods implemented in a server for facilitating the connection of a wireless-enabled product to a private communication network. In such embodiments a server may store an identifier of a customer (a "customer ID") and network credentials for accessing a private communication network of the customer. The server may receive a device ID associated with a wireless-enabled product and the customer ID of the customer purchasing the wireless-enabled product from a computing device enabling a purchase transaction in which the customer purchases the wireless-enabled product. The server may store an association of the customer ID with the device ID. Later, the server may receive the device ID and a security token from the wireless-enabled product through a network connection initiated by the wireless-enabled product. The network connection may be through a guest access mechanism of the access device for the customer's private communication network or a connection through a public network. The server may authenticate the wireless-enabled product based on the received device ID and security token, and provide to the wireless-enabled product the network credentials for accessing the private communication network of the customer in response to authenticating the wireless-enabled product. In some embodiments, the customer ID and the network credentials for accessing the customer's private communication network may be obtained by the server during a customer registration process in which customer information is entered, such as during a sign up procedure for a customer loyalty program.

In some embodiments, the server may receive the device ID and a device security key from a manufacturer of the wireless-enable product, and store the device security key in memory accessible by the server linked to the device ID. In such embodiments, the server may authenticate the wireless-enabled product based on the received device ID and security token by using the received device ID to access the device security key from memory, using the stored device security key to authenticate the received security token, and authenticating the wireless-enabled product if the received device ID enables the server to access a device security key that authenticates the received security token. In some embodiments, the device security key received from the manufacturer of the wireless-enable product may be information that the server can use to generate a security token, and using the stored device security key to authenticate the received security token may include using the device security key received from the manufacturer of the wireless-enable product to obtain a generated security token, and comparing the generated security token to the received security token. In some embodiments, the device security key received from the manufacturer of the wireless-enable product may be a manufacturer-provided security token, and using the stored device security key to authenticate the received security token may include comparing the manufacturer-provided security token to the received security token.

Some embodiments include a server configured to perform server operations of the methods described above. Some embodiments include a wireless-enabled device configured to perform wireless-enabled device operations of the methods described above. Some embodiments include a system made up of a server, a wireless-enabled device, an access device supporting a customer's private communication network, and a computing device configure to enabled to support a purchase transaction in which each of the system components is configured to perform respective operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the invention.

DETAILED DESCRIPTION

Figure 1A:
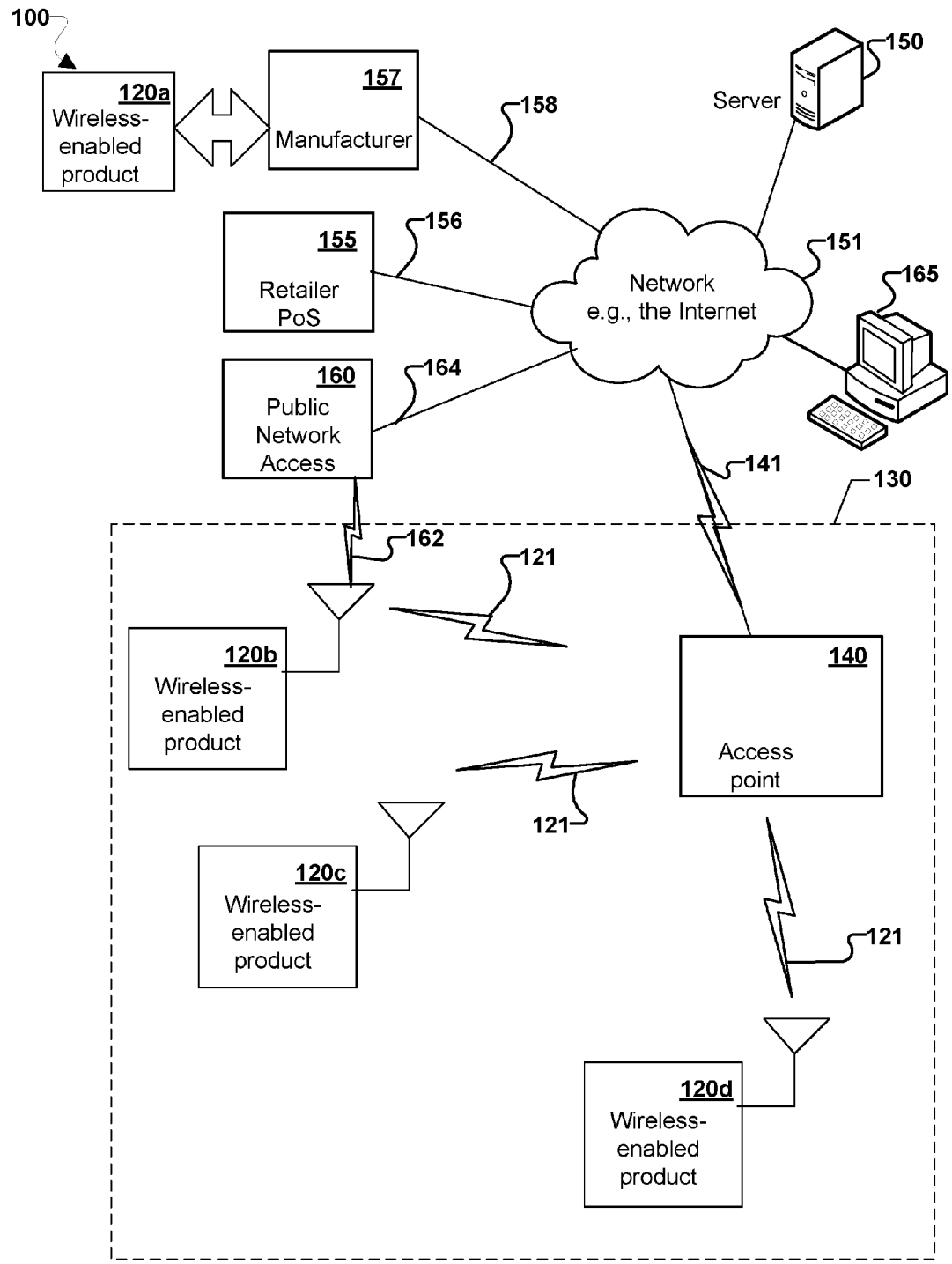
FIG. 1A is a communication network diagram illustrating example components and communication paths for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide systems and methods for facilitating the onboarding of wireless-enabled products and appliances, enabling such smart devices to essentially configure themselves to connect to a customer's wireless network following purchase of the device by the customer. Various embodiments leverage databases maintained in a server that enable correlating headless devices to customer network credentials, and authenticating a headless device before downloading the customer's network credentials. Customers may register once with the server providing a customer identifier ("customer ID") and credentials for accessing the customer's wireless network. When the customer purchases a wireless-enabled product or appliance, the product's identifier ("product ID") and the customer's ID are forwarded to the server. The server uses this information to correlate the product ID to the customer ID it a suitable database. Later, when the wireless-enabled product or appliance accesses the server via an open Internet connection, the product or appliance sends its product ID and a unique token to the server. The server uses the product ID to lookup the corresponding token or authentication credential for the product, and authenticates the product based on the received token. Once authenticated, the server uses the correlated customer ID to look up the network credentials for the customer's private network, and downloads the credentials to the wireless-enabled product or appliance. The wireless-enabled product or appliance then uses the downloaded credentials to access the customer's private network.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of Internet of things (IoT) devices, smart home devices, smart appliances, smart utility meters (gas, electric, etc.), smart parking meters, cellular telephones, smart phones, personal or mobile multi-media players, personal data assistants (PDA's), laptop computers, desktop computers, tablet computers, smart books, palm-top computers, wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar personal electronic devices which include a programmable processor, especially those that include an SoC.

The inability to easily connect wireless-enabled products to the intended network leads to returned products or a poor out-of-box experience for the customer. Given the typical retail purchase framework, whether in-store or on-line/delivery, manufacturers and retailers struggle with reliability and/or complexity issues centered around on-boarding Wi-Fi devices to the customer's network once the device is purchased, brought home or delivered, and opened. Because the retailer and manufacturer are limited in the level of relationship and interaction with the customer, at least initially, it is difficult to provide the kind of technical support that may be necessary to ensure that the customer's initial product experience is a consistently good one.

At the time of in-person purchase or the time of receipt of shipment of a wireless-enabled product or appliance there is no way to ensure the customer can properly activate and install the product once the box is opened and activation is attempted. Further, device activation is often most successful and least frustrating if it is done correctly the first time. Even if the customer has access to the Internet at home, initial activation of a device can be cumbersome and may require several authorization and on-off cycles to complete an activation, with no guarantee that it will be successful and the device will work. This can lead to customer frustration and an overall poor customer experience.

Various embodiments address and overcome the drawbacks of current onboarding mechanisms by providing an automated process for configuring purchased devices to connect to a private wireless network (e.g., a home or commercial WiFi network). In various embodiments, a wireless-enabled product can be associated with the customer at the time of purchase or shipment so the customer does not need to further interact with the device in order for the device to be onboarded onto (i.e., connected to and integrated with) the customer's private network.

FIG. 1A illustrates various computing devices and networks that may function as a system 100 for implementing the various embodiments. The various embodiments facilitate the onboarding of wireless-enabled products 120a-120d into a private wireless network 130. The private wireless network 130 may be built around or facilitated by an access point 140 that establishes wireless connections 121 with a number of wireless-enabled products 120b-120d. The wireless-enabled products 120b-120d may be IoT devices, such as smart light bulbs, network-enabled appliances, and networked home or office systems. The access point 140 may provide a connection to a public network 151 such as the Internet through a connection 141, which may be a wired or wireless connection.

In various embodiments, product manufacturers 157, a server 150, and a retailer point-of-sale device 155 may work together via a network 151 to enable the automatic onboarding of wireless-enabled products 120a-120d. The manufacturer 157 of a wireless-enabled product 120a may configure the product with a product ID and a security token that are stored in memory during product manufacturer, such as during final testing and configuration or while preparing the product for shipment. The product ID may be unique within the population of like products or may be globally unique, such as a product serial number, MAC ID, or other unique identifier. In addition to storing the product ID in non-volatile memory, the product ID may be printed on a product label and/or on packaging, may be encoded in a bar code, may be stored in an RFID tag, or otherwise provided on the packaged product in a manner that can be read at a point-of-sale. The security token that is stored in memory may be a unique value of sufficient digits to reduce the likelihood of being guessed or compromised. In addition to configuring the wireless-enabled product 120a, the manufacturer 157 may communicate the device ID and security token (message 158) to the server 150, such as via the Internet 151.

The server 150 provides the service of automatically providing network credentials to a wireless-enabled product, and thus may be configured with databases and network capabilities sufficient to perform such functions. The server 150 may be associated with the manufacturer 157, may be provided by the retailer, or may be provided as an independent service by a third-party. Server 150 receives the device ID and security token provided by the manufacturer 157 for each wireless-enabled product. This information may be stored in a database, which may be of any type that enables the server to find the corresponding security token when provided the device ID.

The retailer point-of-sale (POS) device 155 may be any of a variety of point-of-sale computing systems that may be used to support purchase transactions for wireless-enabled products. For example, the retailer point-of-sale device 155 may be a server in an online retailer, or a computer at the checkout counter of a brick-and-mortar retailer, a portable transaction terminal carried by an individual, and so on. The retailer POS device 155 includes a connection 156 to a network 151 (e.g., the Internet) through which information can be passed to the server 150 during a purchase transaction. As explained in more detail below, the information that may be obtained during the transaction and passed to the server 150 will typically include the device ID of a wireless-enabled product being purchased as well as a customer ID.

The process of onboarding a wireless-enabled product 120a-120d according to various embodiments includes the wireless-enabled products 120a-120d accessing the server 150 via a public network (e.g., the Internet 151) in order to receive network credentials before it can connect to the private network 130. Accessing the Internet 151 may be accomplished via a wireless connection 162 to a public network access point 160 that provides access to the Internet 151. The access to the server 150 may also be accomplished via a guest network provided by the access point 140 within the customer's own network 130.

Additionally, customers may use any of the variety of computers 165 to register themselves with the server 150. As described below, this registration may involve providing or receiving a customer ID and providing network credentials and other information that wireless enabled products require in order to connect to the customer's private network 130. The customer registration may be accomplished via a website registration using the customer's own computer 165, using a retailer computer (e.g., a POS device) such as while signing up for a customer loyalty program or during the purchase of an access point device before first setting up a private network. In some embodiments, an access point and wireless-enabled product from the same manufacturer may be purchased together at the retailer. In such an example, the network credentials of the access point may be pre-programmed into the wireless-enabled product, or may be stored in advance in the server 150 without the need for a customer to provide the network access information.

Figure 1B:
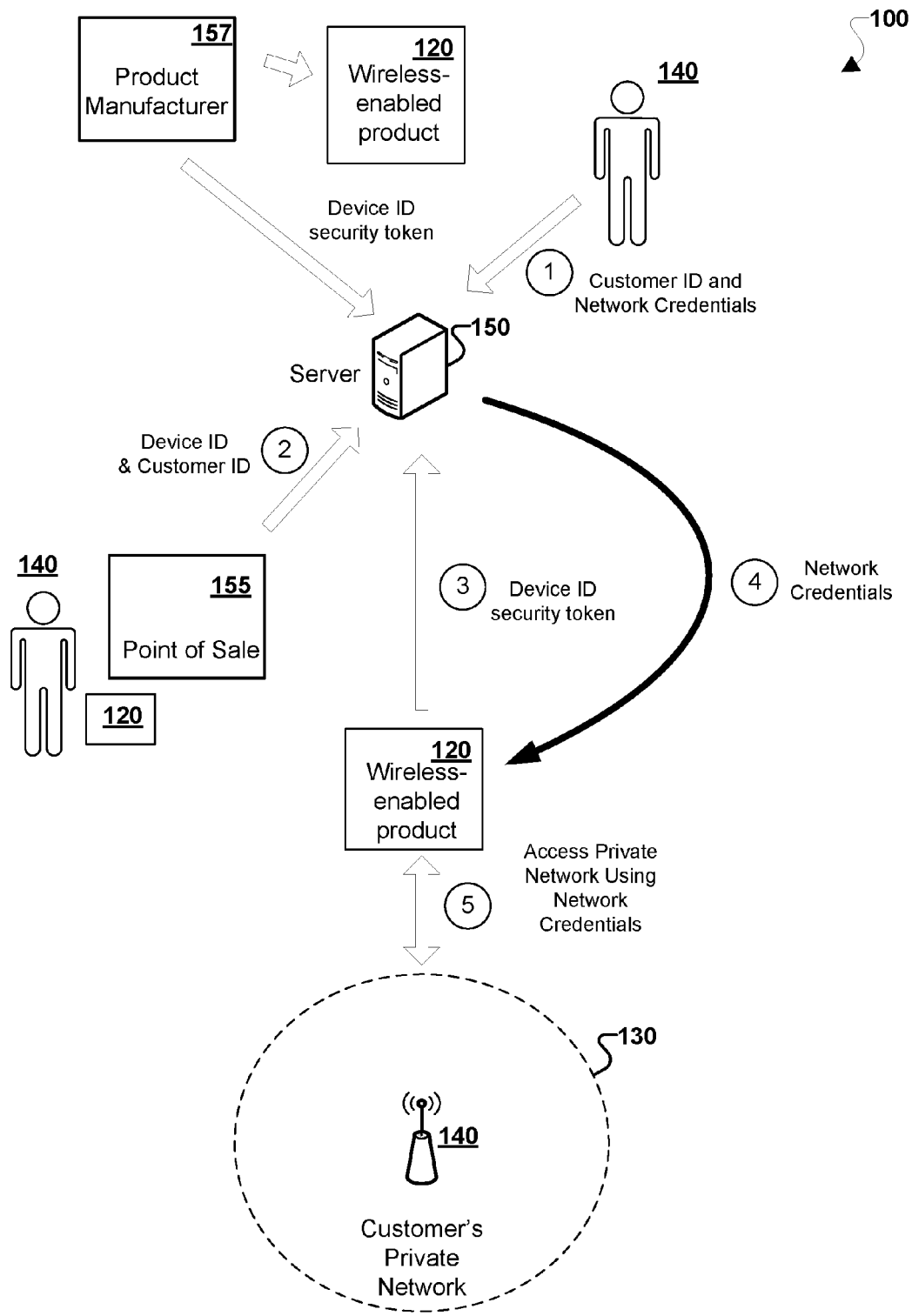
FIG. 1B is communication network diagram illustrating different communication paths among various devices for implementing various embodiments.

FIG. 1B illustrates interactions of the system 100 elements during various operations of completing an onboarding process according to the various embodiments.

During manufacture, the product manufacturer 157 may store a security token and a device ID into non-volatile memory of the wireless-enabled product or appliance 120. Additionally, the product manufacturer 157 may provide the security token and device ID to the server 150 for recording in a database maintained in or accessible to the server to enable later authentication of the wireless-enabled product or appliance.

At some time prior to or during a purchase, the customer 140 registers (communication 1) with the server 150 for automatic onboarding. During this one-time registration, the customer provides the server with the credentials and configuration information (referred to generally herein as "network credentials") for accessing the customer's private wireless network on which various wireless-enabled products or appliances will be onboarded. As part of the registration process, the customer 140 may enter or be provided with a customer ID, and the server may store the network credentials in a database linked the customer ID. The registration process may be accomplished via a website registration, at the point-of-sale, as part of a loyalty program sign up procedure for a retailer, manufacturer, or other entity, or by other registration practices. In some cases, the registration may be accomplished during the purchase of a wireless access point that will provide the basis for the customer's private wireless network. Thus, the customer 140 provides the server with the information needed by wireless-enabled products or appliances become integrated into the customer's private network.

At the time of purchase, a retailer may obtain the device ID for an appliance, a device or other wireless-enabled product 120, such as by scanning a barcode, typing the printed on a label into a point-of-sale computer, or wirelessly receiving the device ID from a near field communication (NFC) or RFID (radiofrequency identifier). Also at the time of purchase, the retailer may obtain the customer ID of the customer 140. The customer ID may be obtained by scanning a retailer's loyalty card (or other identifying mechanism), enabling the customer to type an identifier into a keypad, or wirelessly via NFC communications with the customer's smartphone. During on-line purchases, the customer may be required to enter his/her customer ID as part of completing the transaction. As part of completing be purchase transaction, be retailer sends (communication 2) the obtained device ID and customer ID to the server. The server then correlates the device ID with the customer ID in a database (e.g., linking the two identifiers, generating a new database, or adding one of the identifiers to a database keyed to the other identifier).

When the purchased wireless-enabled product or appliance is received by the customer 140, the customer powers on the wireless-enabled product and enables the wireless-enabled product to connect to the Internet via an open network (e.g., a guest network or public WiFi access point). Upon connecting to the Internet, the wireless-enabled product accesses and registers with the server (communication 3), providing the device ID and security token that were loaded in memory at the time of manufacture. The server authenticates the wireless-enabled product based on the device ID and security token using any of a variety of authentication mechanisms, such as using the device ID to locate a corresponding record in a database and comparing the received security token to the security token stored in the database. In some embodiments, the security token may include a shared key that enables the wireless-enabled product and the server to communicate via an encrypted communication protocol. Without the proper key, the wireless-enabled product cannot communicate with the server.

Once the wireless-enabled product is authenticated by the server, the server may use the customer ID correlated to the device ID to access the customer's network credentials that were stored during the customer registration process. The server may use the established Internet connection to download or otherwise provide (communication 4) the customer's network credentials and other information (access point SSID, etc.) to the wireless-enabled product. The wireless-enabled product may save the information in a memory (e.g., non-volatile memory). During the download process the server may also send commands to the wireless-enabled product to facilitate the onboarding process, such as confirming that the credentials have been accurately downloaded and recorded, directing the product to configure various communication parameters, and otherwise enable the product to connect to the customer's private network.

Once the network credentials have been downloaded and the wireless-enabled product is configured for the customer's private network, the wireless-enabled product may disconnect from the public network and attempt to connect to the customer's private network 130 using the received network credentials (communication 5). The wireless-enabled product 120 and the access point 140 of the private network 130 may complete the onboarding process automatically using the network credentials received from the server. Thus, the various embodiments enable a wireless-enable product to be onboarded to a customer's private wireless network 130 without any efforts on the part of the customer 140 with the exception of the prior one-time registration with the server (communication 1).

Figure 2:
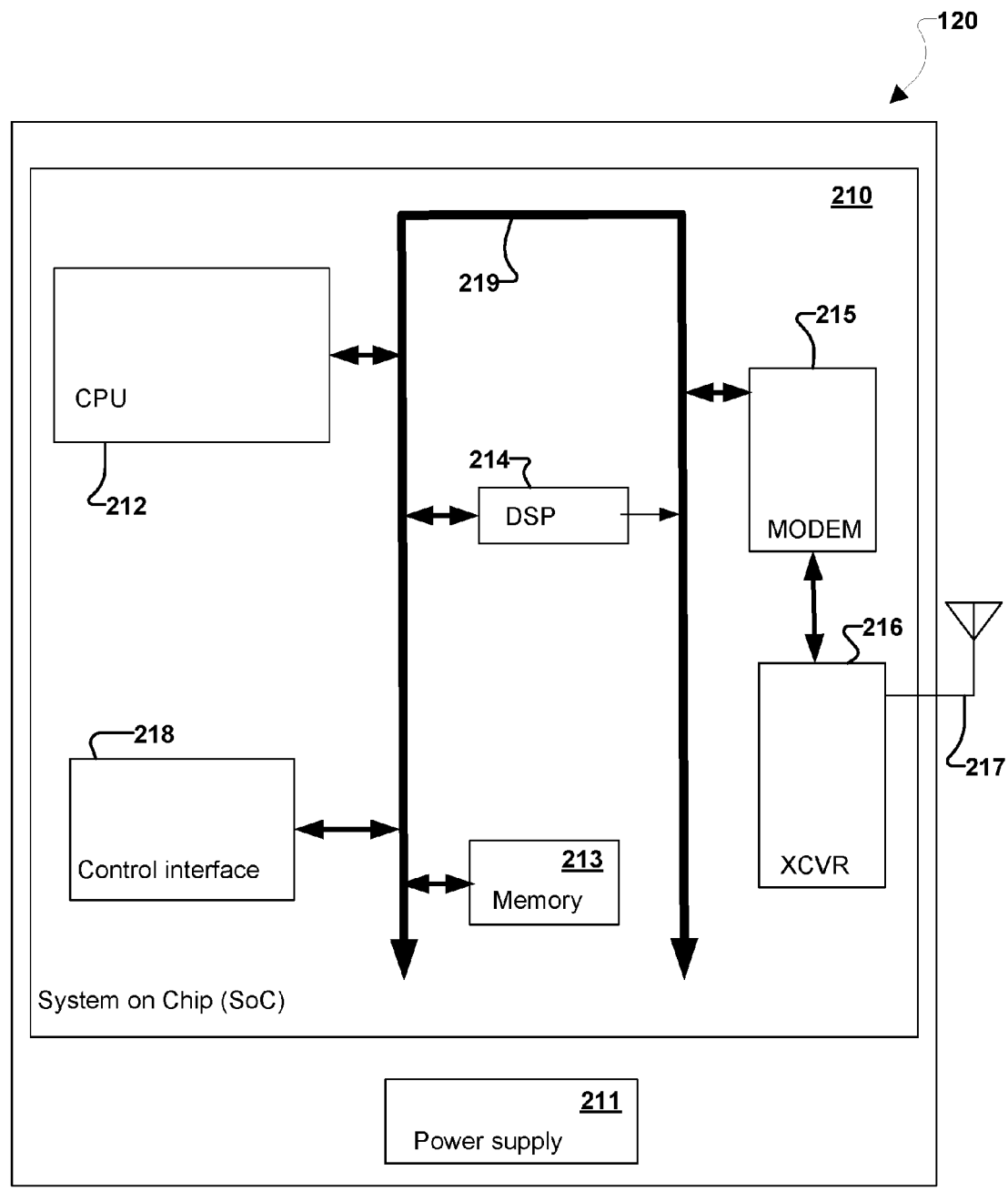
FIG. 2 is a block diagram illustrating components of an example wireless-enabled product or appliance suitable for use with various embodiments.

FIG. 2 illustrates various components of a typical wireless-enabled product 120 suitable for use with various embodiments. Any of a variety of electrical devices (e.g., light bulbs) and appliances (e.g., toasters, refrigerators, etc.) may be equipped with wireless capability by including a wireless interface 210 within the device. Such a wireless interface 210 may include a power supply 211, such as a circuit configured to convert a power supply of the device into a form and voltage suitable for the wireless interface 210. The wireless interface 210 may include a central processor unit (CPU) 212 that may be coupled via a bus 219 to memory 213, a digital signal processor (DSP) 214, a modem 215 and transceiver 216, a control interface 218, other components (not shown). The CPU 212 may control overall operations and communications. The modem 215 and transceiver 216 may communicate with the customer's private network 130 via wireless transmissions from an antenna 217. The control interface 218 may include circuitry for controlling the device or appliance 120, such as a rheostat or switch for controlling the amount of light produced by a smart light bulb. In some implementations, the wireless interface at 210 may be implemented as a system-on-a-chip (SoC).

Figure 3A:
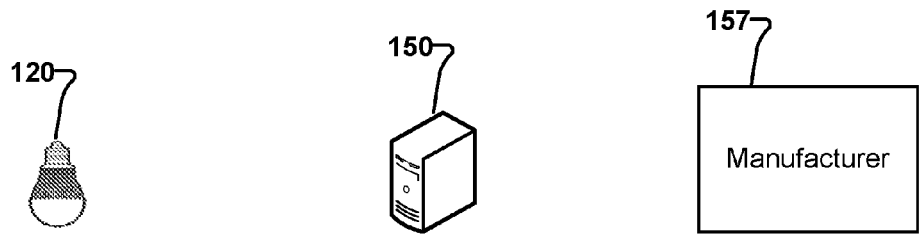
FIG. 3A is a message flow diagram illustrating message flows associated with assigning a device ID to a wireless-enabled product in accordance with various embodiments.
Figure 3A:
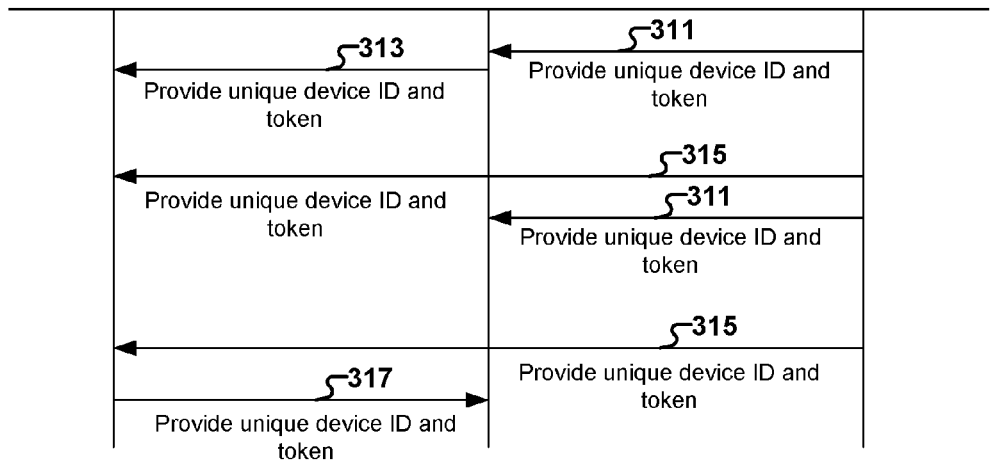

FIGS. 3A-3E illustrate various communications exchanged between components and computing devices with the system 100 for implementing the various embodiments. Referring to FIG. 3A, the device ID and security token may be generated and uploaded or otherwise provided to the wireless-enabled product 120 via a number of different processes. For example, the manufacturer 157 may provide the device ID and the security token in communication 311 to the server 150, and the server may provide the device ID and the security token to the wireless-enabled product 120 in communication 313. As another example, the manufacturer 157 may store the device ID and the security token in the wireless-enabled product 120 in communication 315 and may inform the server 150 of the device ID and the security token in communication 311. In a further example, the manufacturer 157 may store the device ID and security token in the wireless-enabled product 120 in communication 315, and the wireless-enabled product 120 may provide the device ID and security token to the server 150 in communication 317.

Figure 3B:
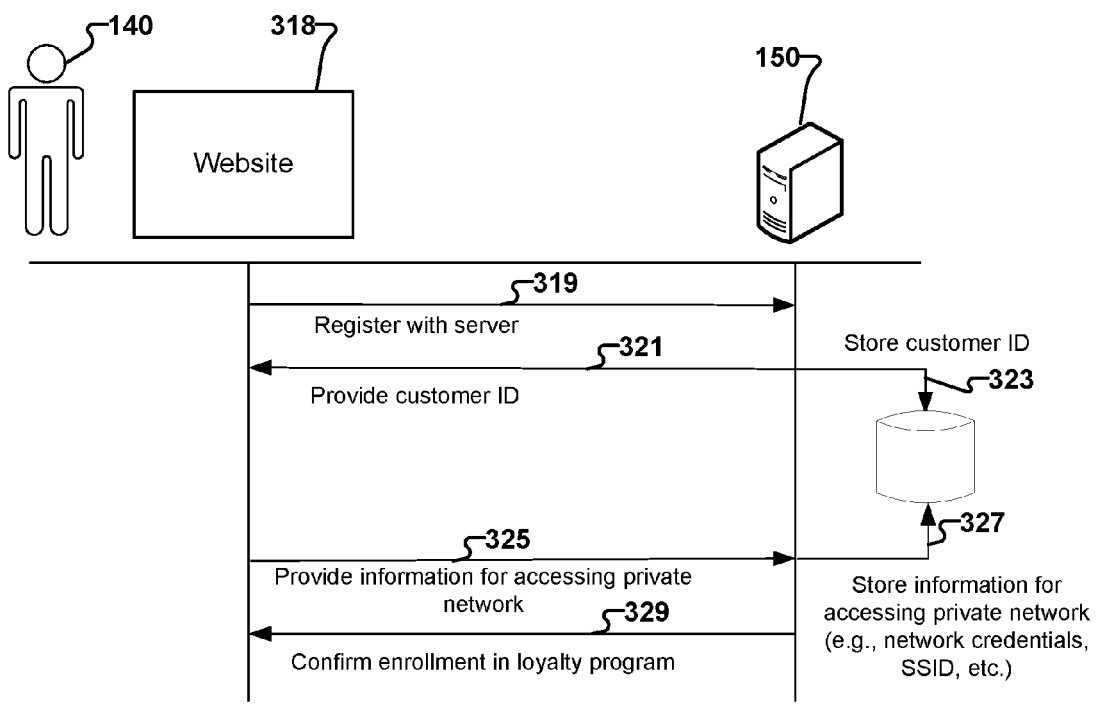
FIG. 3B is a message flow diagram illustrating message flows associated with registration of customer information in accordance with various embodiments.

FIG. 3B illustrates example communications involved in registering a customer 140 with the server 150. In some instances, the customer 140 may access the server 150 via a website 318 accessed by a computing device (e.g., the customer's computer 165). Through interacting with the website 318, the customer 140 may initiate registration with the server in communication 319. This registration process may also be accomplished as part of registering with a retailer or manufacturer customer loyalty program. The server 150 may generate a customer ID and provide that customer ID to the customer 140 in communication 321. The server may also store the customer ID and a database in operation 323.

As part of the registration process, the customer 140 may provide network credentials and other information necessary for accessing the customer's private network in communication 325. The provision of information for accessing the private network may include providing a name of the private network and/or SSID, and a password or encryption key (which are collectively referred to herein as network credentials). In instances in which the customer registration is being accomplished as part of purchasing a network access point, generating the name of the private network and password/encryption key may be accomplished as part of the purchase transaction at a point-of-sale. The server may store the information for accessing the private network in operation 327. When the registration process is completed, the server may send a message 329 confirming that the enrollment has been successfully completed. In instances in which the enrollment with the server 150 is part of the customer loyalty program, further communications associated with the loyalty program may follow.

Figure 3C:
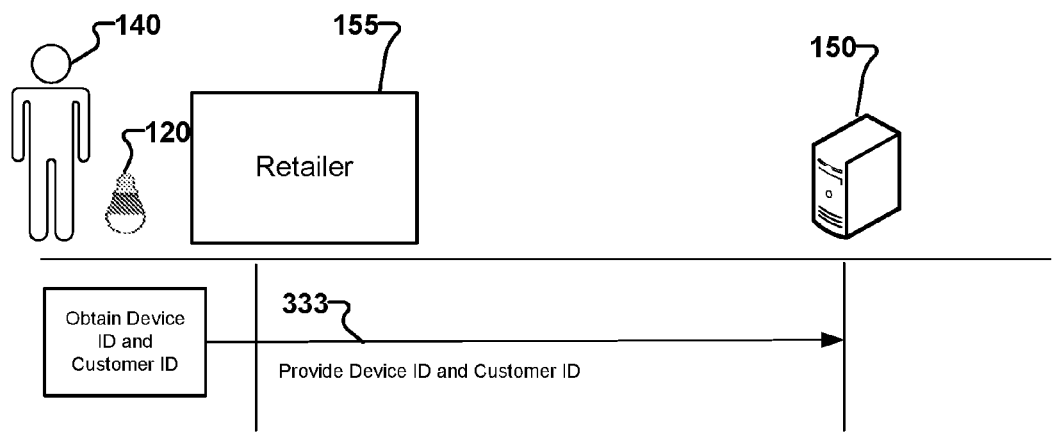
FIG. 3C is a message flow diagram illustrating message flows associated with providing a device ID and a customer ID obtained during a transaction in accordance with various embodiments.

FIG. 3C illustrates communications from the point-of-sale computing device, such as the retailer point-of-sale device 155 to the server 150 during a purchase transaction for the wireless-enabled product 120. During the transaction, the retailer obtains the device ID and the customer ID, and transmits this information in communication 333 to the server 150, such as via the Internet, via a private connection with the manufacturer, or another connection. As mentioned above, the retailer point-of-sale device 155 may obtain the device ID by scanning a barcode on the product package, entering a code printed on the product package into the point-of-sale computing device, the retail point-of-sale device 155, reading an RFID tag or scanning a NFC device embedded in the product packaging using an RFID or NFC reader included in the point-of-sale computing device, the retail point-of-sale device 155, or another mechanism. The retailer may obtain the customer ID by scanning a customer loyalty card, looking the customer up in a database by customer number, phone number or other information, having the customer enter the ID into a keypad, or other mechanism.

Figure 3D:
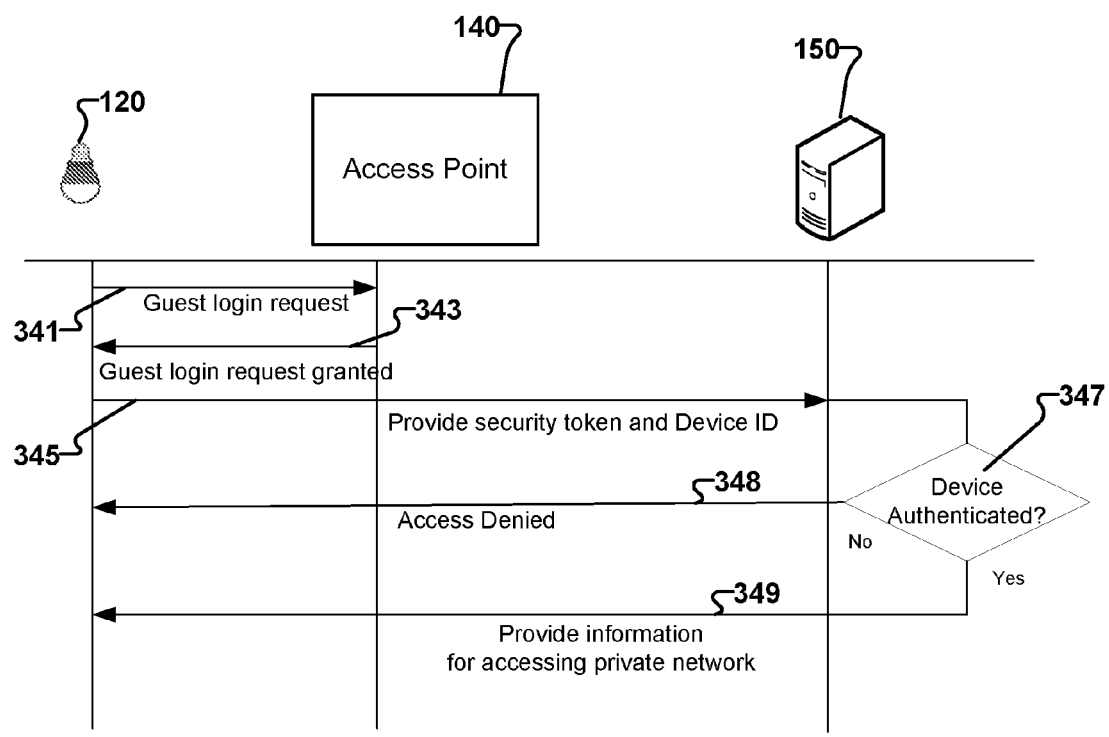
FIG. 3D is a message flow diagram illustrating message flows associated with authenticating a wireless-enabled product and with obtaining information for accessing a private network by a wireless-enabled product in accordance with various embodiments.

FIG. 3D illustrates communications and processes involved in authenticating a wireless-enabled product 120 and providing the network access information. When the wireless-enabled product 120 is powered on within range of the customer's private network access point 140, the product may attempt to find an open network connection or may request a guest login in communication 341. The access point 140 may grant a login request in communication 343, and wireless-enabled product 120 uses the access point 140 to access the server 150 and provide product's device ID and security token to the server 150 in communication 345. The server 150 may use the device ID and security token to determine whether the product is authenticated in operation 347. If the server 150 determines that the wireless-enabled project 120 is not authenticated, the server 150 may send an access denied communication 348 to the wireless-enabled product 120. If the server 150 authenticates the wireless-enabled product 120, the server 150 may send the network credentials and other information for accessing the customer's private network to the wireless-enabled product in communication 349.

Figure 3E:
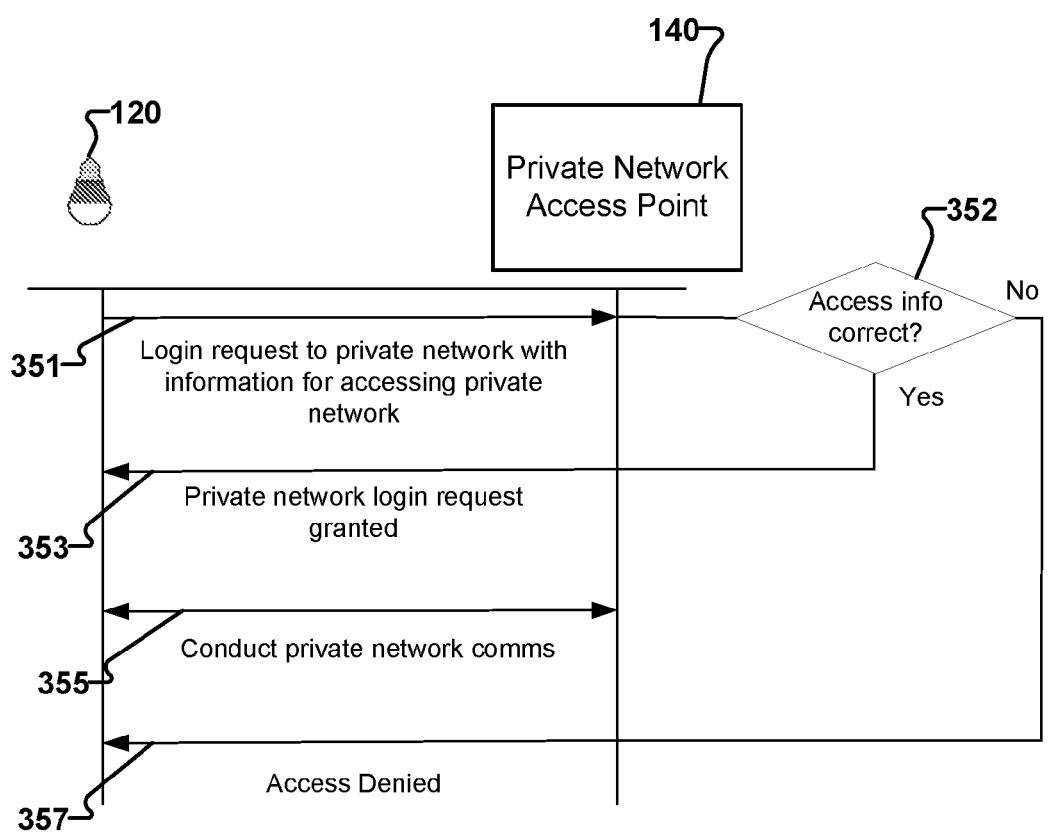
FIG. 3E is a message flow diagram illustrating message flows associated with accessing a private network by a wireless-enabled product using information for accessing a private network in accordance with various embodiments.

FIG. 3E illustrates communications involved in the wireless-enabled product 120 accessing the private network 130. In communication 351, the wireless-enabled product 120 may send a login request to the private network access point 140 using the information for accessing the network (network credentials) provided by the server 150. In determination block 352, a processor of the private network access point 140 may determine in whether the information for accessing the network is correct. In response to determining that the information for accessing the private network is correct (i.e., determination block 352="Yes"), the processor of the private network access point 140 may grant the private network login request in communication 353 and establish a secure communication link with the wireless-enabled product 120. Using this establish communication link, the wireless-enabled product 120 and the access point 140 may exchange communications 355 as part of an Internet of Things network, such as control commands, operating status, etc. In response to determining that the information for accessing the private network is not correct (i.e., determination block 352="No"), the processor of the private network access point 140 may deny access to the private network in communication 357.

Figure 4:
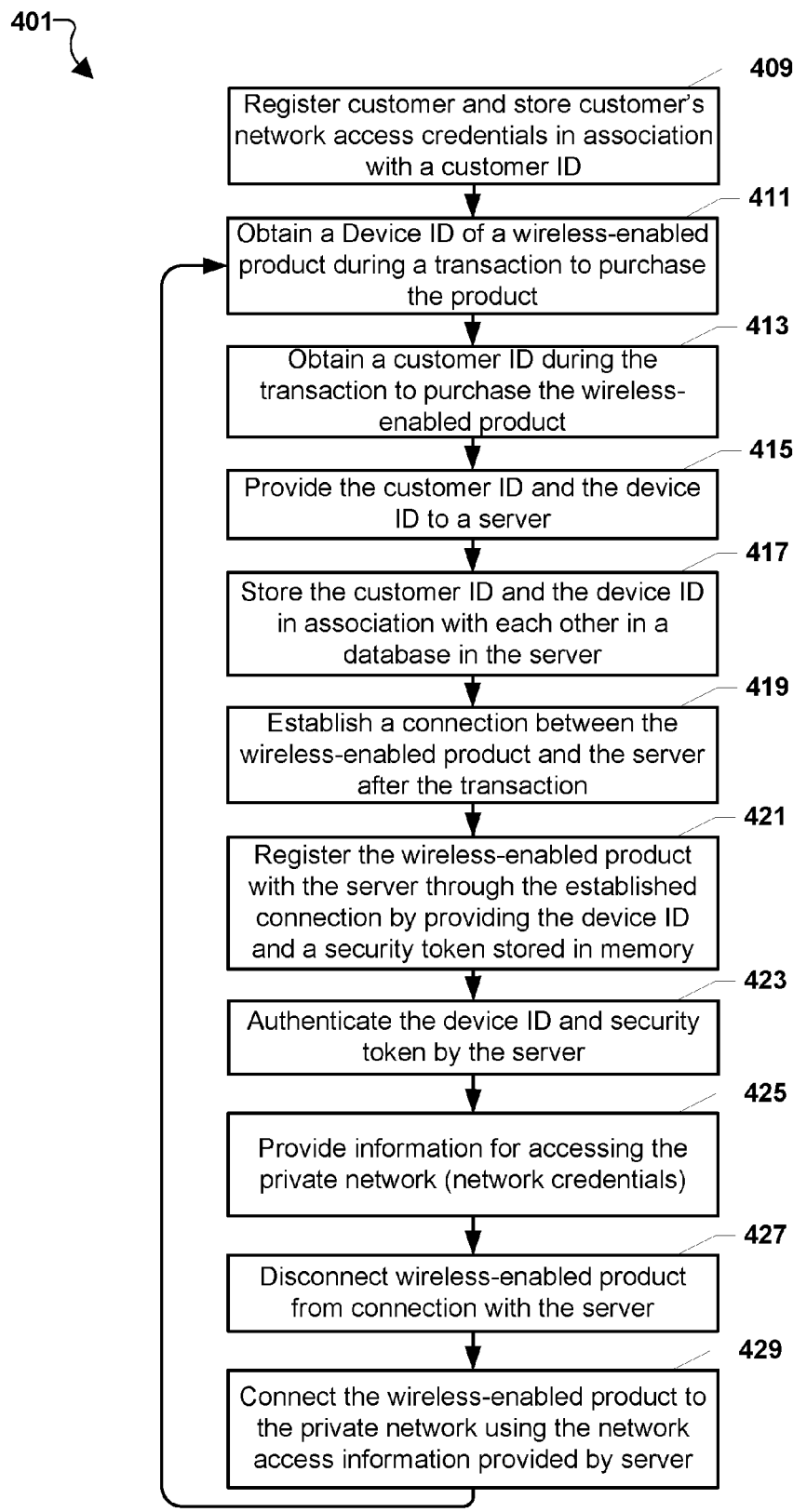
FIG. 4 is a process flow diagram illustrating an embodiment method for a system that provides access to a private communication network for a wireless-enabled product in accordance with various embodiments.

FIG. 4 illustrates a method 401 for automating the onboarding of a wireless-enabled product according to various embodiments. With reference to FIGS. 1A-4, the operations of the method 401 may be performed by the wireless-enabled product 120, server 150, and point-of-sale computing device, the retail point-of-sale device 155 as described above.

In block 409, the customer may register with the server providing network access credentials and related information to the server and receiving a customer ID. As described above, this registration of the customer with the server may be accomplished as part of the customer loyalty registration process, as part of a purchase of a network access point, by the customer accessing a website and filling in a registration form, or other process. As part of this registration, the customer may provide and the server may store the network access credentials and related information in a database linked to the customer ID process in block 409. When the customer purchases an access point along with the wireless-enabled device, the server may already have stored the network access credentials.

In block 411, a retailer point-of-sale device may obtain the device ID of a wireless-enabled product during a transaction to purchase the product by a customer. In block 413, the retailer point-of-sale device may obtain the customer ID as part of the transaction. In block 415, the point-of-sale device may provide the customer ID and the device ID to the server.

In block 417, the server may associate the received customer ID and device ID in a database, such as by storing the customer ID and the device ID in a transaction database, or updating either a database of customer IDs or a database of device IDs to indicate the correlation.

Sometime after the transaction is completed, the wireless-enabled product may be powered on and establish a connection between the product and the server via a public network in block 419. In block 421, the wireless-enabled product may register with the server through the established Internet connection by providing the device ID and security token that were stored in memory when the product was manufactured.

In block 423, the server may authenticate the wireless-enabled product based on the device ID and the security token. This authentication may use any form of authentication process based on two or more unique identifiers and security information. For example, the server may use the device ID to look up a database record in which a corresponding security token is stored, and then compare the received security token to the token stored in the database to determine whether they are the same. As another example, the server may use the device ID to look up a corresponding record in which a hash algorithm or encryption key are stored that the server can use to generate a value that is compared to the received security token.

If the server authenticates the wireless-enabled product in block 423, the server may transmit the information for accessing the private network of the customer (e.g., sending network credentials) to the wireless-enabled product via the open communication link over a public network in block 425. As part of the operations in block 425, the wireless-enabled product may store the network credentials and other information for accessing the private network.

In block 427, the wireless-enabled product may terminate the public connection to the server, and in block 429, the wireless-enabled product may connect to the private network of the customer using the network credentials and other access information provided by the server.

The customer registration process in block 409 need only be performed once, but the operations in blocks 411 through 429 of the method 401 may be performed each time that the customer purchases another wireless-enabled product for connection to the customer's private network.

Figure 5:
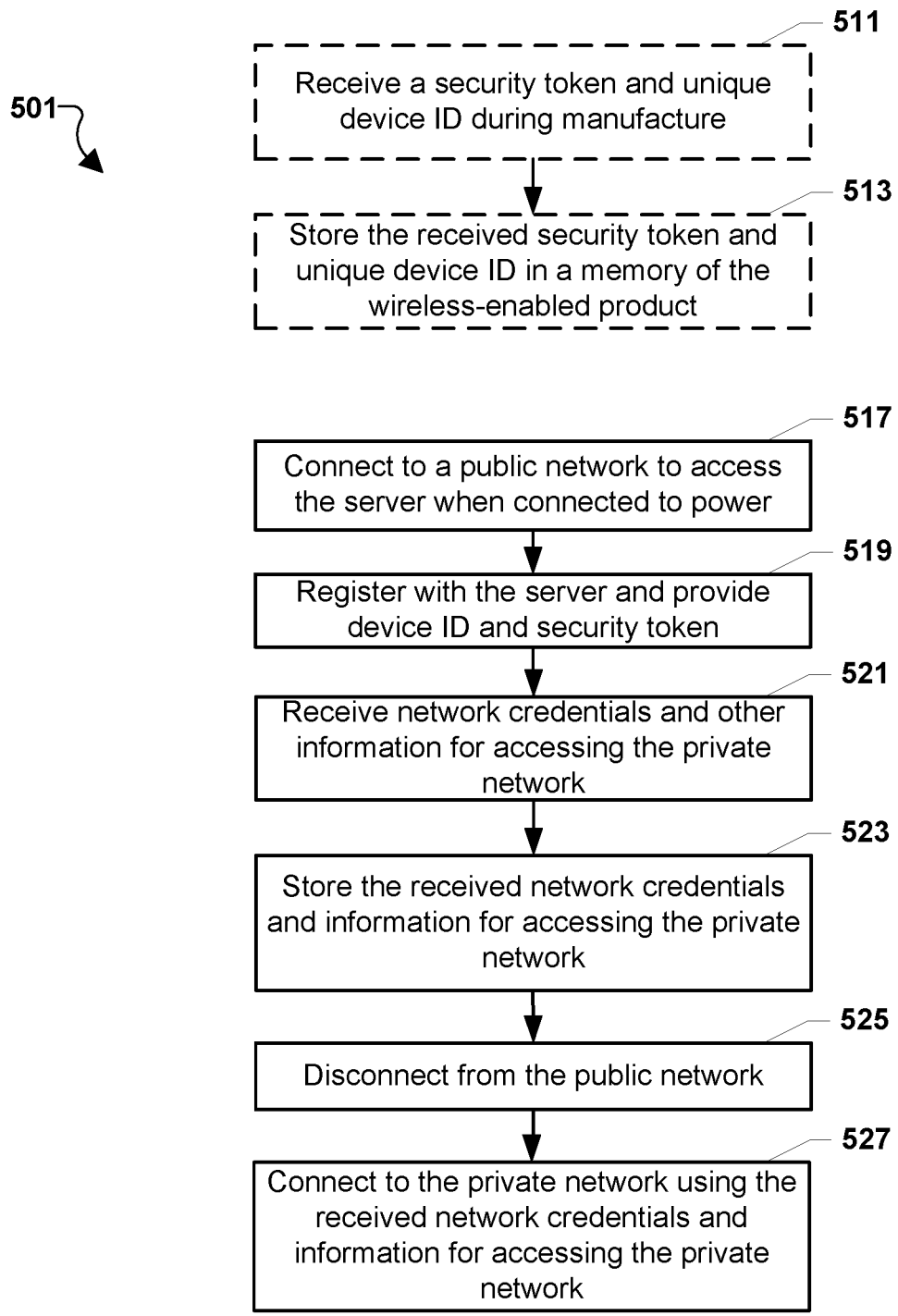
FIG. 5 is a process flow diagram illustrating an embodiment method for accessing a private network by a wireless-enabled product in accordance with various embodiments.

FIG. 5 illustrates a method 501 that may be implemented in a wireless-enabled product according to various embodiments. In block 511 the product may receive a security token and unique device ID during manufacturer or product testing/configuration. In block 513, the wireless-enabled product may store the received security token and device ID in memory.

In block 517, the wireless-enabled product may connect to a public network to access the server when the product is connected to a power source. Thus, when the customer brings the product home (or to another location) and connects it to a power source, the wireless-enabled product may begin to search for a wireless network. When the product finds an open (i.e. public) network, the wireless-enabled product uses that network to communicate with the server. Until a connection to the server is established, the wireless-label product may continue to look for a public network to accomplish such communications.

Once a connection to the server is established, the wireless-enabled product may register with the server by providing the device ID and security token stored in memory in block 519. In block 521, such as in response to a successful registration/authentication by the server, the wireless-enabled product may receive network credentials and other information for accessing the customer's private network.

In block 523, the wireless-enabled product may store the received network credentials and information associated with accessing the private network that were received from the server. In block 525, the wireless-enabled product may disconnect from the public network, and connect to the private network using the received network credentials and information in block 527.

Figure 6:
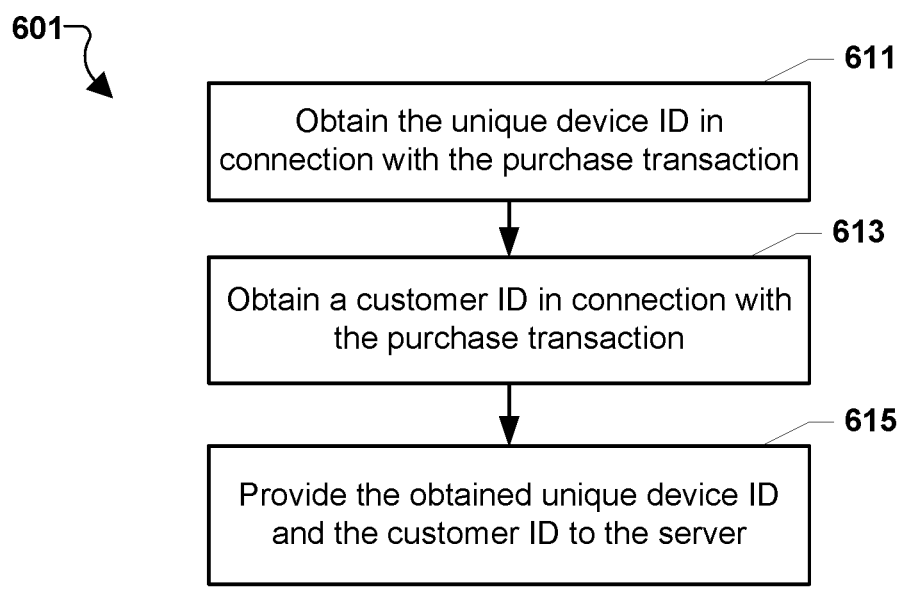
FIG. 6 is a process flow diagram illustrating a method that may be implemented in a point-of-sale device during a transaction to purchase a wireless-enabled product in accordance with various embodiments.

FIG. 6 illustrates a method 601 that may be implemented in a point-of-sale computing device (e.g., the retail point-of-sale device 155). In block 611, the point-of-sale device may obtain the device ID of a wireless-enabled product in connection with a purchase transaction. In block 613, the point-of-sale device may obtain the customer ID of the individual purchasing the wireless-enabled product. In block 615, the point-of-sale device may transmit the obtained device ID and customer ID to the server.

Figure 7:
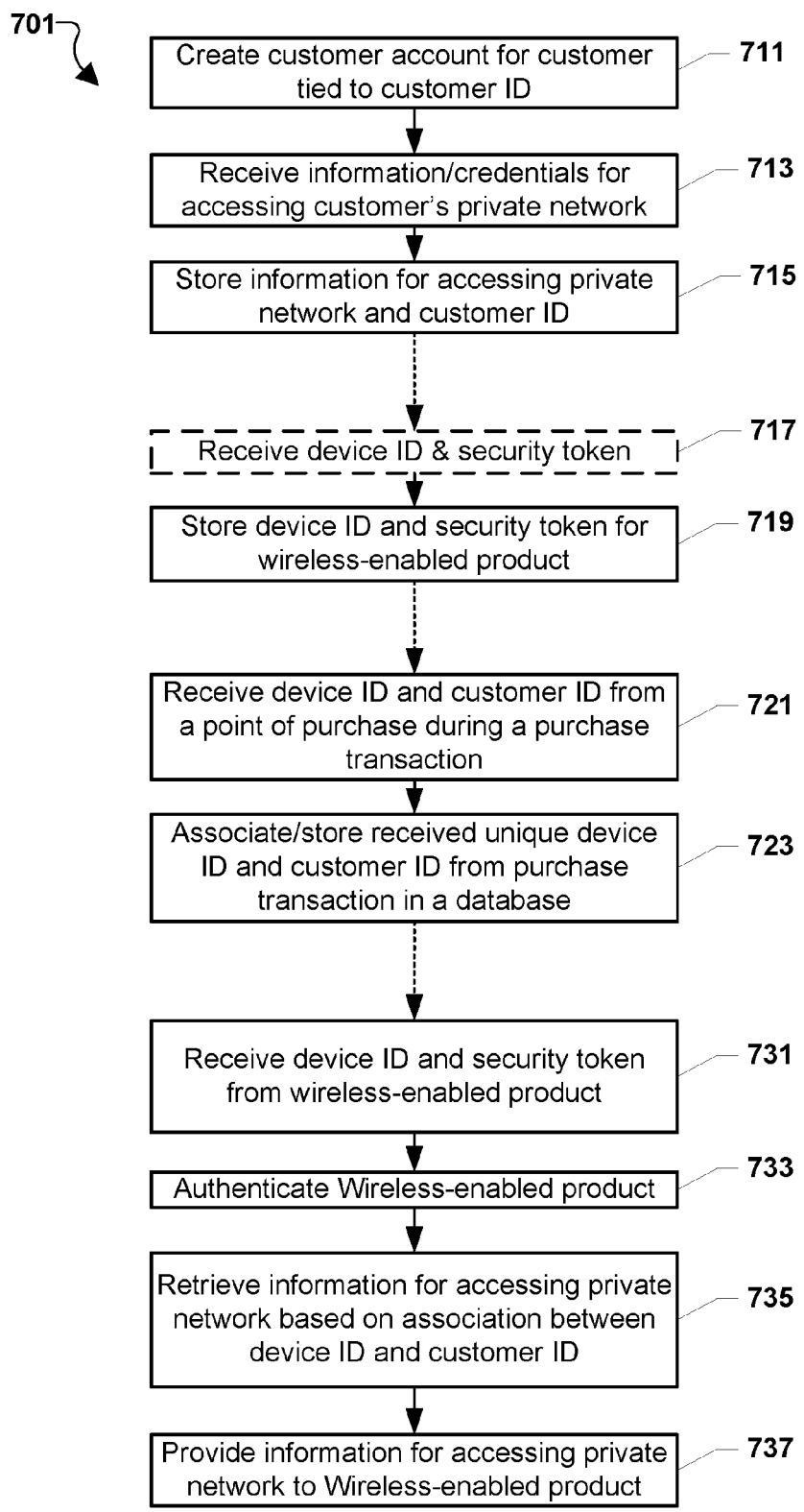
FIG. 7 is a process flow diagram illustrating a method for supporting the automatic onboarding of a wireless-enabled product implement in a server in accordance with various embodiments.

FIG. 7 illustrates a method 701 that may be implemented in a server for supporting the automatic onboarding of a wireless-enabled product according to various embodiments.

In block 711, the server may conduct a customer registration process in which a customer account is created for customer that is tied to a customer identifier (e.g., a customer ID). The server may generate the customer ID on behalf of the customer, or receive a customer ID (e.g., an email address) from the customer.

In block 713, the server may receive the customer network credentials and other information for accessing the customer's private network from the customer, which may be entered by the customer as part of the customer registration process. In block 715, the server may store the identifier of the customer (e.g., the customer ID') along with the network credentials for accessing the private communication network of the customer in a database. In some embodiments the network credentials may be linked to the customer ID in the database.

In block 717, the server may receive the device ID and a device security key (e.g., the device security token or information that can be used to generate or authenticate the device security token) for the wireless-enabled product. For example, in some implementations the server may receive the device ID and security token from the product manufacturer and store the device security key block 717. In other implementations, in block 717 the server may receive from the product manufacture the device ID and information (e.g., an algorithm or seed token for shared algorithm) that the server can use to generate the security token. In further implementations, the server may generate the device ID and security token and provide that information to the device manufacturer for storage in the wireless-enabled product. In block 719, the server may store the device ID and security key for the wireless-enabled product in memory accessible by the server linked to the device ID in a searchable database (e.g., indexed to the product ID).

Subsequently, the server may receive from a computing device enabling a purchase transaction (e.g., a point-of-sale computing device) of the wireless-enabled product by the customer a device ID and customer ID in block 721. In block 723, the server may store an association of the received customer ID and received device ID in a database. The association may enable the server to identify the associated customer ID when provided with the device ID. This operation may involve correlating two databases, such as linking the customer ID to the device ID, or generating a new database, such as a database that includes the customer ID and device ID, such as indexed on the device ID.

Subsequently, the server may receive the device ID and security token from a wireless-enabled product via a public network connection initiated by the wireless-enable product in block 731. This will occur, when the wireless-enabled product is powered on and has access to a public network.

In block 733, the server may authenticate the wireless-enabled product based on the received device ID and security token. For example, the server may use the device ID to access a database record in which is stored a device security key (e.g., the device security token or information that the server can use to generate or validate the device security token) other authentication information that the server can use to authenticate the wireless-enabled product.

If the server authenticates the wireless-enabled product based upon the receipt security token, the server may retrieve information for accessing the customer's private network from a database using the customer ID in block 735. The information retrieval may be accomplished by using the association between the device ID and the customer ID previously stored in block 723 to identify the database record containing the network credentials and information for accessing the customer's private network that were stored in block 715. In block 737, the server may provide the network credentials and information for accessing the customer's private communication network of the to the wireless-enabled product using the open connection via the public network.

Figure 8:
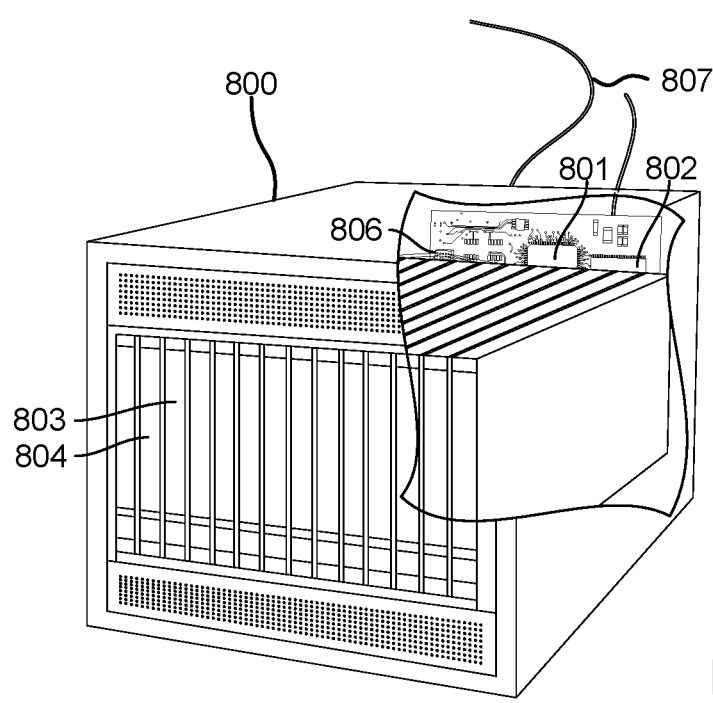
FIG. 8 is a component diagram illustrating an example server suitable for use in accordance with various embodiments.

The various embodiments, including the embodiment methods illustrated in FIGS. 5-7 may be implemented in the server and the point-of-sale device using any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or digital versatile disc (DVD) disc drive 804 coupled to the processor 801. The server 800 may also include network access ports 806 coupled to the processor 801 for establishing network interface connections with a network 807, such as a local area network coupled to other broadcast system computers and servers.

The processor 801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 802, or 803 before they are accessed and loaded into the processor 801. The processor 801 may include internal memory sufficient to store the application software instructions. In many devices the internal memory may be a volatile or nonvolatile memory, such as flash memory, or a mixture of both. For the purposes of this description, a general reference to memory refers to memory accessible by the processor 801 including internal memory or removable memory plugged into the device and memory within the processor 801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of facilitating connecting a wireless-enabled product to a private communication network, comprising:
obtaining, by a server, a customer ID and network credentials for accessing a customer's private communication network during a sign up procedure for a customer loyalty program;
storing in the server the received customer ID and the received network credentials;
receiving in the server from a computing device enabling a purchase transaction in which the customer purchases the wireless-enabled product, a device ID associated with the wireless-enabled product and the customer ID of the customer;
storing in the server an association of the customer ID with the device ID;
receiving in the server the device ID and a security token from the wireless-enabled product through a network connection initiated by the wireless-enabled product;
authenticating, by the server, the wireless-enabled product based on the received device ID and security token; and
providing, by the server to the wireless-enabled product, the network credentials for accessing the private communication network of the customer in response to authenticating the wireless-enabled product.

2. The method of claim 1, further comprising:
receiving by the server the device ID and a device security key from a manufacturer of the wireless-enabled product; and
storing the device security key in memory accessible by the server linked to the device ID,
wherein authenticating, by the server, the wireless-enabled product based on the received device ID and security token comprises:
using the received device ID to access the device security key from memory;
using the stored device security key to authenticate the received security token; and
authenticating the wireless-enabled product if the received device ID enables the server to access the device security key that authenticates the received security token.

3. The method of claim 2, wherein:
the device security key received from the manufacturer of the wireless-enabled product comprises information that the server can use to generate a security token; and
using the stored device security key to authenticate the received security token comprises:
using the device security key received from the manufacturer of the wireless-enabled product to obtain a generated security token; and
comparing the generated security token to the received security token.

4. The method of claim 2, wherein:
the device security key received from the manufacturer of the wireless-enabled product comprises a manufacturer-provided security token; and
using the stored device security key to authenticate the received security token comprises comparing the manufacturer-provided security token to the received security token.

5. The method of claim 1, wherein the network connection initiated by the wireless-enabled product is a connection to the server through a guest access mechanism of an access device for the customer's private communication network.

6. The method of claim 1, wherein the network connection initiated by the wireless-enabled product is a connection through a public network.

7. A server configured to facilitate connecting a wireless-enabled product to a private communication network, comprising:
a memory,
a server processor coupled to the memory, wherein the server processor is configured with processor-executable instructions to perform operations comprising:
obtaining a customer ID and network credentials for accessing a customer's private communication network during a sign up procedure for a customer loyalty program;
storing the received customer ID and the received network credentials;
receiving from a computing device involved in a purchase of the wireless-enabled product by the customer the customer ID and a device ID of the wireless-enabled product;
storing an association of the customer ID with the device ID;
receiving the device ID and a security token from the wireless-enabled product through a network connection established by the wireless-enabled product;
authenticating the wireless-enabled product based on the received device ID and security token; and
providing to the wireless-enabled product the network credentials for accessing the private communication network of the customer in response to authenticating the wireless-enabled product.

8. The server of claim 7, wherein the server processor is configured with processor-executable instructions to perform operations further comprising:
receiving the device ID and a device security key from a manufacturer of the wireless-enabled product; and
storing the device security key in memory accessible by the server linked to the device ID,
wherein the server processor is configured with processor-executable instructions to authenticate the wireless-enabled product based on the received device ID and security token by:
using the received device ID to access the device security key from memory;
using the stored device security key to authenticate the received security token; and
authenticating the wireless-enabled product if the received device ID enables the server to access the device security key that authenticates the received security token.

9. The server of claim 8, wherein the device security key received from the manufacturer of the wireless-enabled product comprises information that the server can use to generate a security token; and
the server processor is configured with processor-executable instructions to use the stored device security key to authenticate the received security token by:
using the device security key received from the manufacturer of the wireless-enabled product to obtain a generated security token; and
comparing the generated security token to the received security token.

10. The server of claim 8, wherein the device security key received from the manufacturer of the wireless-enabled product comprises a manufacturer-provided security token; and the server processor is configured with processor-executable instructions to use the stored device security key to authenticate the received security token by comparing the manufacturer-provided security token to the received security token.

11. A system for facilitating connections of wireless-enabled products to private communication networks, comprising:

a server configured to be accessible via a public network;
a wireless-enabled product;
an access device providing a private communication network of a customer; and
a computing device coupled to the public network and configured to support a purchase transaction by the customer of the wireless-enabled product,
wherein the server is configured to perform operations comprising:
obtaining a customer ID and network credentials for accessing a customer's private communication network during a sign up procedure for a customer loyalty program; and
storing the received customer ID and the received network credentials,
wherein the computing device is configured to perform operations comprising:
obtaining a device ID associated with the wireless-enabled product and the customer ID of the customer; and
providing the customer ID and the device ID to the server;
wherein the server is configured to perform operations further comprising storing an association of the customer ID and the device ID,
wherein the wireless-enabled product is configured to perform operations comprising:
establishing a connection to the server; and
transmitting the device ID and a security token to the server through the established connection;
wherein the server is configured to perform operations further comprising:
authenticating the wireless-enabled product based on the device ID and security token; and
providing to the wireless-enabled product via the established connection the network credentials for accessing the private communication network of the customer in response to the authenticating the wireless-enabled product, and
wherein the wireless-enabled product is configured to perform operations further comprising:
disconnecting the established connection to the server; and
establishing a connection with the private communication network upon entering a communication range of the access device for the private communication network using the network credentials for accessing the customer's private communication network provided by the server.

12. The system of claim 11, wherein the server is configured with processor-executable instructions to perform operations further comprising:

receiving the device ID and a device security key from a manufacturer of the wireless-enabled product; and
storing the device security key in memory accessible by the server linked to the device ID,
wherein the server is configured with processor-executable instructions to authenticate the wireless-enabled product based on the received device ID and security token by:
using the received device ID to access the device security key from memory;
using the stored device security key to authenticate the received security token; and
authenticating the wireless-enabled product if the received device ID enables the server to access the device security key that authenticates the received security token.

13. The system of claim 12, wherein:

the device security key received from the manufacturer of the wireless-enabled product comprises information that the server can use to generate a security token; and
the server is configured with processor-executable instructions to use the stored device security key to authenticate the received security token by:
using the device security key received from the manufacturer of the wireless-enabled product to obtain a generated security token; and
comparing the generated security token to the received security token.

14. The system of claim 12, wherein:

the device security key received from the manufacturer of the wireless-enabled product comprises a manufacturer-provided security token; and
the server is configured with processor-executable instructions to use the stored device security key to authenticate the received security token by comparing the manufacturer-provided security token to the received security token.

15. The system of claim 11, wherein the computing device is configured to obtain the customer ID by obtaining the customer ID from a customer loyalty database associated with a retailer.

16. The system of claim 11, wherein the wireless-enabled product is configured to establish the connection to the server by establishing the connection to the server through a guest access mechanism of the access device for the customer's private communication network.

17. The system of claim 11, wherein the wireless-enabled product is configured to establish the connection to the server comprises establishing the connection to the server through the public network.

* * * * *